(12) United States Patent
Zink

(10) Patent No.: US 10,211,472 B2
(45) Date of Patent: Feb. 19, 2019

(54) MULTI-FLUID NOZZLES

(71) Applicant: Delavan Inc, West Des Moines, IA (US)

(72) Inventor: Gregory A. Zink, Des Moines, IA (US)

(73) Assignee: Delavan Inc., West Des Moines, IA (US)

( * ) Notice: Subject to any disclaimer, the term of this patent is extended or adjusted under 35 U.S.C. 154(b) by 111 days.

(21) Appl. No.: 14/813,285

(22) Filed: Jul. 30, 2015

(65) Prior Publication Data
US 2017/0033377 A1 Feb. 2, 2017

(51) Int. Cl.
*B05B 7/06* (2006.01)
*H01M 8/04082* (2016.01)
*B05B 7/10* (2006.01)

(52) U.S. Cl.
CPC ......... *H01M 8/04201* (2013.01); *B05B 7/066* (2013.01); *B05B 7/10* (2013.01)

(58) Field of Classification Search
CPC ........... H01M 8/04201; H01M 8/0258; H01M 8/0267; H01M 8/04276; H01M 8/2484; H01M 8/2483; H01M 8/04; H01M 8/04007–8/04074; B05B 7/066; B05B 7/10; B05B 1/26; B05B 7/0441; B05B 7/0466; B05B 7/0483
USPC .......................................... 239/403; 261/79.2
See application file for complete search history.

(56) References Cited

U.S. PATENT DOCUMENTS

| | | | | |
|---|---|---|---|---|
| 8,074,895 B2* | 12/2011 | Mao | ......................... | C01B 3/38 239/102.1 |
| 8,641,020 B2* | 2/2014 | Gurin | ..................... | F02M 29/00 261/79.1 |
| 8,919,670 B2* | 12/2014 | Shivaram | ................ | C21B 7/163 239/403 |
| 2007/0141409 A1* | 6/2007 | Cho | .................. | H01M 8/04022 429/410 |

* cited by examiner

*Primary Examiner* — Darren W Gorman
*Assistant Examiner* — Juan C Barrera
(74) *Attorney, Agent, or Firm* — Locke Lord LLP; Daniel J. Fiorello; Scott D. Wofsy

(57) ABSTRACT

A fuel cell nozzle includes a fuel circuit receiver configured to receive a fuel circuit and an air circuit. At least a portion of the air circuit is integrally formed with the fuel circuit receiver. The nozzle can further include a base portion that is configured to interface with a fuel cell. The fuel circuit receiver and the air circuit can extend from the base portion.

9 Claims, 3 Drawing Sheets

MULTI-FLUID NOZZLES

BACKGROUND

1. Field

The present disclosure relates to nozzles, more specifically to spray nozzles, such as nozzles for spaying fluids into a fuel cell.

2. Description of Related Art

Traditional fuel cell nozzles include fuel, air, and sometimes steam circuits that mix at a nozzle tip of the nozzle where the fluids enter a fuel cell reformer. The air is frequently heated, so the fuel circuit must be heat-shielded to ensure against coke formation within the fuel circuit. This heat shielding can add cost, weight and complexity to the fuel cell nozzles. Moreover, thermal stresses at boundaries between hot (air/steam) passages and cool (fuel) passages can lead to damage and/or limited useful life.

Such conventional methods and systems have generally been considered satisfactory for their intended purpose. However, there is still a need in the art for improved fuel cell nozzles. The present disclosure provides a solution for this need.

SUMMARY

A fuel cell nozzle includes a fuel circuit receiver configured to receive a fuel circuit and an air circuit that is thermally isolated from the fuel circuit receiver by a space defined between the fuel circuit receiver and the air circuit. The nozzle can further include a base portion that is configured to interface with a fuel cell. The fuel circuit receiver and the air circuit can extend from the base portion. At least a portion of the air circuit is integrally formed with the fuel circuit receiver.

The air circuit can be isolated from the fuel circuit receiver by air along a length of the fuel circuit receiver. The air circuit can be concentrically disposed around the fuel circuit receiver.

The air circuit can include a toroidal inlet portion. The air circuit can include a plurality of flow branches that connect the toroidal inlet portion to the base portion.

At least one of the flow branches can be spiral. For example, the plurality of flow branches can include four spiral flow branches.

In certain embodiments, at least a portion of the air circuit can accommodate thermal growth displacements independently of the fuel circuit receiver. The toroidal inlet portion can be disconnected from the fuel circuit receiver such that the toroidal inlet portion and/or the plurality of branches can move relative to the fuel circuit receiver when subject to thermal loading that induces displacements.

The base portion can define a mixing cavity. An air swirler can be disposed in the mixing cavity. In certain embodiments, the air swirler can be a separate piece from the base portion.

The nozzle can further include the fuel circuit disposed within the fuel circuit receiver. The fuel circuit can include a fuel inlet connector, a fuel tube partially disposed in the fuel inlet connector, and a fuel tip disposed at an end of the fuel tube such that the tip is in fluid communication downstream of the air swirler in the mixing cavity.

A multi-fluid flow nozzle can include a first flow circuit, a second circuit that is thermally isolated from the first flow circuit by a space defined between the first flow circuit and the second circuit, and a base portion, wherein the first circuit receiver and the second circuit extend from the base portion, wherein the base portion defines a mixing cavity for mixing at least a first fluid and a second fluid. The multi-fluid flow nozzle can include similar features as described above with respect to a fuel cell injector as is appreciated by those skilled in the art.

A method of manufacturing a fuel cell nozzle can include forming a fuel circuit receiver and an air circuit in a unitary structure such that the fuel circuit receiver and the air circuit are thermally isolated. In certain embodiments, forming can include additively manufacturing the fuel circuit receiver and the air circuit to be a unitary structure. Forming can include concentrically forming the air circuit around the fuel circuit receiver.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
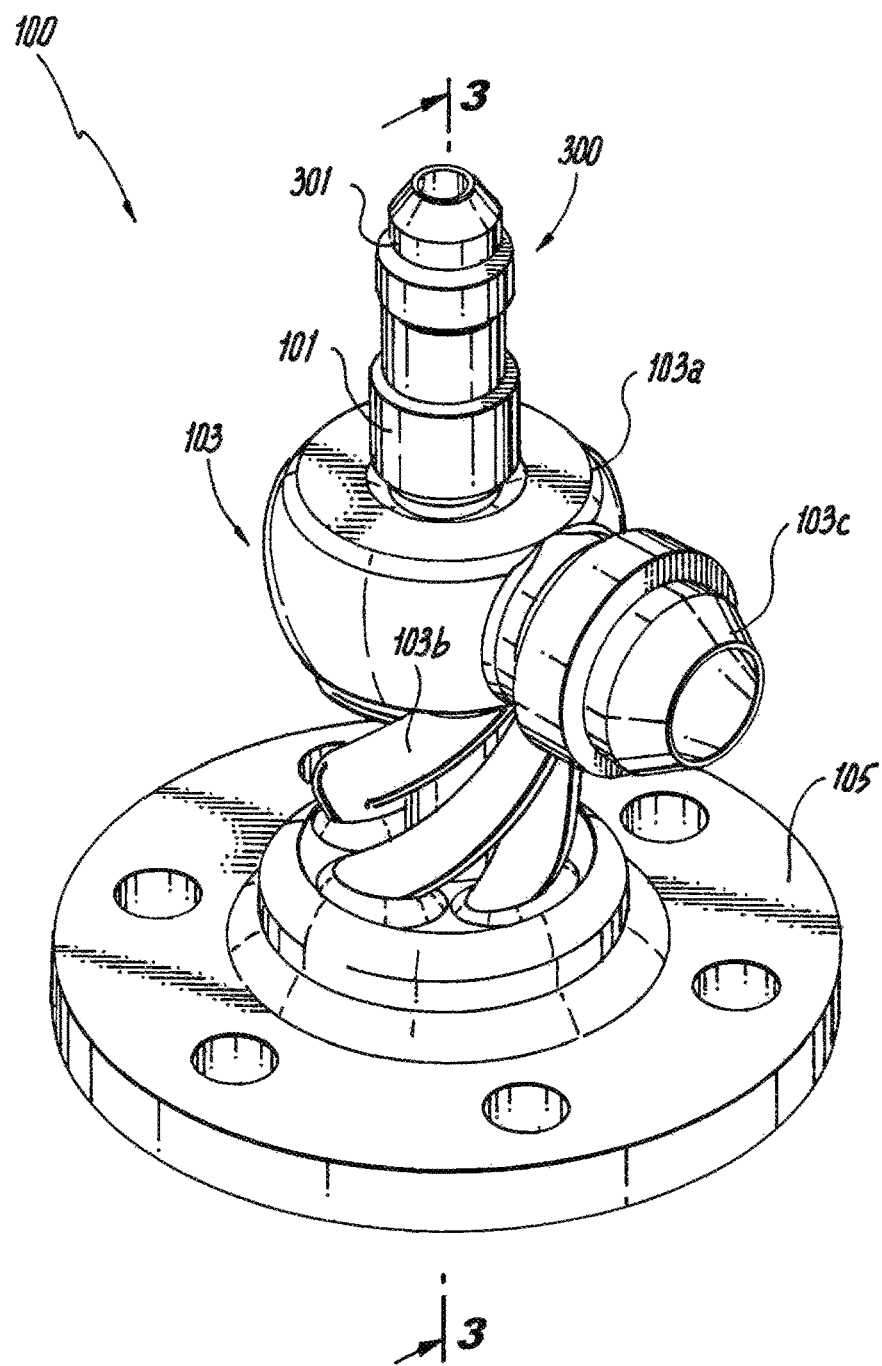
FIG. 1 is a perspective view of an embodiment of a fuel cell injector in accordance with this disclosure.
Figure 2:
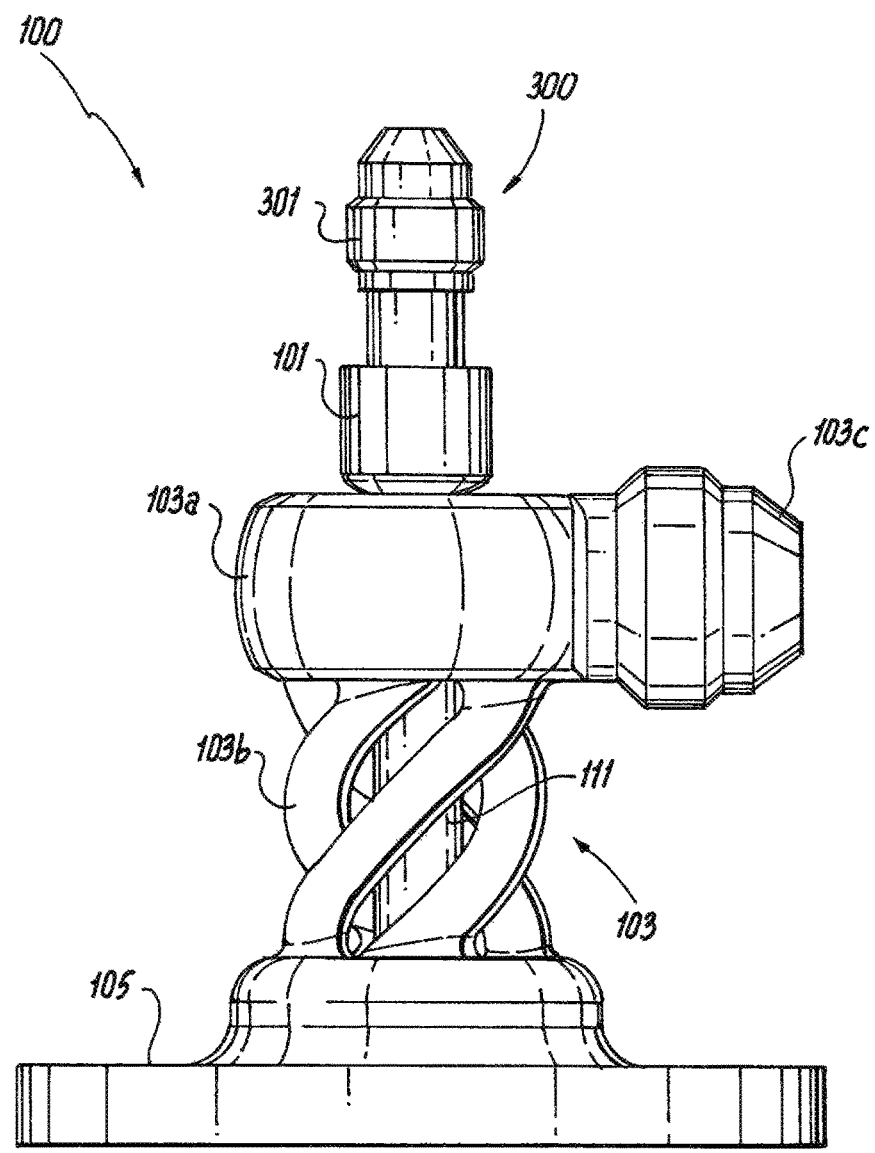
FIG. 2 is a side elevation view of the fuel cell injector of FIG. 1.
Figure 3:
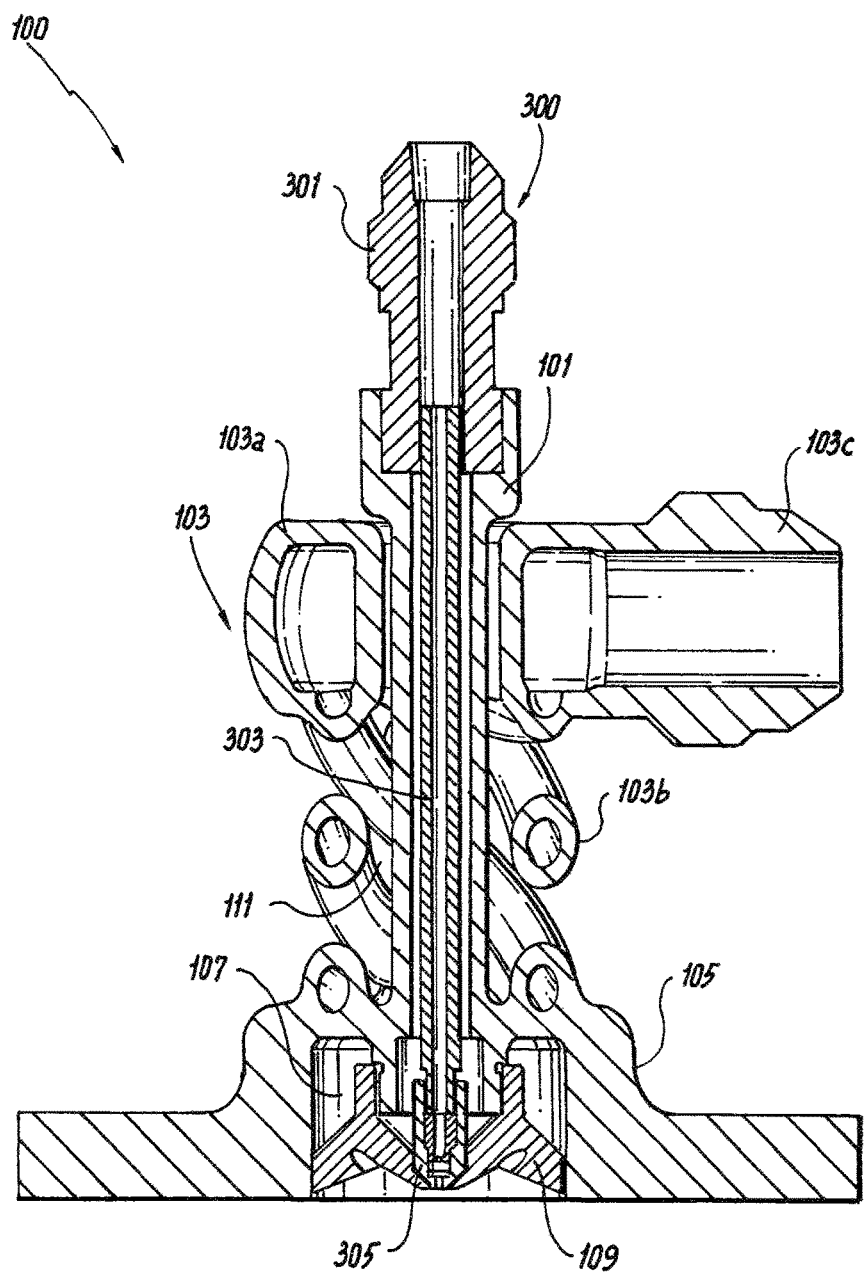
FIG. 3 is a cross-sectional elevation view of the fuel cell injector of FIG. 1.

Reference will now be made to the drawings wherein like reference numerals identify similar structural features or aspects of the subject disclosure. For purposes of explanation and illustration, and not limitation, an illustrative view of an embodiment of a fuel cell injector in accordance with the disclosure is shown in FIG. 1 and is designated generally by reference character 100. Other embodiments and/or aspects of this disclosure are shown in FIGS. 2 and 3. The systems and methods described herein can be used to thermally isolate fuel from hot air and/or steam until a mixing point in a fuel cell injection system.

Referring to FIGS. 1, 2, and 3, a fuel cell nozzle 100 includes a fuel circuit receiver 101 configured to receive a fuel circuit (e.g., fuel circuit 300 described below) and an air circuit 103. The air circuit 103 can be thermally isolated from the fuel circuit receiver by a space 111 defined between the fuel circuit receiver 101 and the air circuit 103. As shown, in certain embodiments, at least a portion of the air circuit 103 can be integrally formed with the fuel circuit receiver 101.

The nozzle 100 can further include a base portion 105 that is configured to interface with a fuel cell (e.g., a hydrogen fuel cell or any other suitable fuel cell). The fuel circuit receiver 101 and the air circuit 103 can extend from the base portion 105 such that the air circuit 103 and the fuel circuit receiver 101 are integral with each other through the base portion 105 and/or in any other suitable manner.

As shown, the air circuit 103 can be isolated from the fuel circuit receiver 101 by air along any suitable length of the fuel circuit receiver 101. This can provide a thermal barrier such that the air circuit 103 can be thermally isolated from the fuel circuit 101 in order to prevent heating the fuel in the event the injected fluid (e.g., hot air and/or steam) is above a temperature desired for the fuel in the fuel circuit 101.

In certain embodiments, the air circuit 103 can be concentrically disposed around the fuel circuit receiver 101. As shown, the air circuit 103 can include a toroidal inlet portion 103a (e.g., that forms a collar around the fuel circuit receiver 101 but does not contact the fuel circuit receiver 101). In certain embodiments, the air circuit 103 can include a plurality of flow branches 103b that connect the toroidal inlet portion 103a to the base portion 105. Also as shown, the toroidal inlet portion 103a can be in fluid communication with an inlet nozzle 103c which is configured to connect to one or more fluid sources (e.g., heated air and/or steam).

In certain embodiments, at least one of the flow branches 103b can be spiral. For example, the plurality of flow branches 103b can include four spiral flow branches 103b. As a result, at least a portion of the air circuit 103 can be moveable relative to the fuel circuit receiver 101. For example, the toroidal inlet portion 103a can be disconnected from the fuel circuit receiver 101 such that the toroidal inlet portion 103a and/or the plurality of branches 103b can move relative to the fuel circuit receiver 101 (e.g., axially due to thermal growth). It is contemplated that such spiral shaped branches 103b can also provide a flexibility and/or restoring force similar to a spring as a result of their spiral shape.

Referring to FIG. 3, the base portion 105 can define a mixing cavity 107. An air swirler 109 can be disposed in the mixing cavity 107. In certain embodiments, the air swirler 109 can be a separate piece from the base portion 105 (e.g., brazed to the base portion 105). However, it is contemplated that the air swirler 109 can be integrally formed with the base portion 105. In certain embodiments, the branches 103b can be configured to open up into the mixing cavity 107 to induce a swirl within the mixing cavity before passing through the swirler 109.

As shown, the fuel circuit 300 can be disposed within the fuel circuit receiver 101. The fuel circuit 300 can include a fuel inlet connector 301, a fuel tube 303 partially disposed in the fuel inlet connector 301, and a fuel tip 305 disposed at an end of the fuel tube 303 such that the tip 305 is in fluid communication downstream of the air swirler 109 in the mixing cavity 107.

The fuel inlet connector 301 can be threaded to the fuel circuit receiver 101 or connected thereto in any other suitable manner. The fuel tube 303 can be connected to the fuel inlet connector 301 and the tip 305 in any suitable manner (e.g., brazing, threading, or the like).

While the embodiment as shown in FIGS. 1-3 show a single air circuit 103 and a single fuel circuit receiver 101, any suitable number of air, fuel, or other fluid circuits are contemplated herein. For example, the air circuit 103 can be modified, as is understood by those skilled in the art, to include any suitable number of isolated passages therein to define separate flow paths (e.g., one for air and one for steam) such that two separate fluids and remain isolated until released into the mixing cavity 107.

While embodiments are described above as a fuel cell injector, it is contemplated that embodiments can be any suitable multi-fluid flow nozzle for any suitable use. For example, a multi-fluid flow nozzle can include a first flow circuit and/or circuit receiver similar to fuel circuit receiver 101 as described above, a second circuit similar to air circuit 103 as described above, and a base portion as described above. The multi-fluid flow nozzle can include any other similar features as described above with respect to a fuel cell injector as is appreciated by those skilled in the art.

In accordance with at least one aspect of this disclosure, a method of manufacturing a fuel cell nozzle 100 can include forming a fuel circuit receiver 101 and an air circuit 103 in a unitary structure such that the fuel circuit receiver 101 and the air circuit 103 are thermally isolated. In certain embodiments, forming can include additively manufacturing the fuel circuit receiver 101 and the air circuit 103 to be a unitary structure. Forming can include concentrically forming the air circuit 103 around the fuel circuit receiver 101. Any other suitable components to the method and/or pre-processing steps and/or post processing steps are contemplated herein. in any suitable order.

As described above, additive manufacturing technologies and/or other methods of manufacture can be utilized to decouple air/steam and fuel circuits within the same part until the fluids reach a mixing cavity. Certain embodiments allow fuel and air circuits to run concentrically yet thermally isolated so the fuel is protected from coking.

Additionally, certain embodiments eliminate thermal contact areas that allow heat convection between the cool and hot sides of the nozzle (which can lead to thermal stress in the part) without specific heat shielding required such that weight and cost can be reduced.

The methods and systems of the present disclosure, as described above and shown in the drawings, provide for nozzles (e.g., fuel nozzles) with superior properties including thermal isolation and material stress reduction. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A fuel cell nozzle, comprising: a fuel circuit receiver configured to receive a fuel circuit; an air circuit that is thermally isolated from the fuel circuit receiver by a space defined between the fuel circuit receiver and the air circuit; and a base portion comprising a mixing cavity where the fuel circuit and the air circuit are in fluid communication and wherein the air circuit extends from the base portion, wherein the space is defined from an inlet portion of the air circuit to the base portion such that the air circuit is thermally isolated from the fuel circuit receiver between the inlet portion and the base portions wherein the base portion is configured to interface with a fuel cell, wherein the fuel circuit receiver and the air circuit extend from the base portion, wherein at least a portion of the air circuit is integrally formed with the fuel circuit receiver through the base portion, wherein the air circuit is concentrically disposed around the fuel circuit receiver, wherein the air circuit includes a toroidal inlet portion, wherein the air circuit includes a plurality of flow branches that connect the toroidal inlet portion to the base portion, and wherein at least one of the plurality of flow branches are spiral.

2. The nozzle of claim 1, wherein the air circuit is isolated from the fuel circuit receiver by air along a length of the fuel circuit receiver.

3. The nozzle of claim 1, wherein the plurality of flow branches include four spiral flow branches.

4. The nozzle of claim 1, wherein at least a portion of the air circuit is moveable relative to the fuel circuit receiver due to displacements caused by thermal growths.

5. The nozzle of claim 1, wherein the toroidal inlet portion is disconnected from the fuel circuit receiver such that the toroidal inlet portion and/or the plurality of branches can move relative to the fuel circuit receiver due to displacements caused by thermal growth.

6. The nozzle of claim 1, further comprising an air swirler in the mixing cavity.

7. The nozzle of claim 6, wherein the air swirler is a separate piece from the base portion.

8. The nozzle of claim 7, further comprising the fuel circuit disposed within the fuel circuit receiver.

9. The nozzle of claim 8, wherein the fuel circuit includes a fuel inlet connector, a fuel tube partially disposed in the fuel inlet connector, and a fuel tip disposed at an end of the fuel tube such that the tip is in fluid communication downstream of the air swirler in the mixing cavity.

* * * * *